US011760622B2

(12) United States Patent
Duncan et al.

(10) Patent No.: US 11,760,622 B2
(45) Date of Patent: Sep. 19, 2023

(54) METHODS AND SYSTEMS FOR ON DEMAND FUEL SUPPLY

(71) Applicant: Texas Fueling Services, Inc., Houston, TX (US)

(72) Inventors: Mason Duncan, Houston, TX (US); Hanan Tuchshnieder, Bellaire, TX (US)

(73) Assignee: Texas Fueling Services, Inc., Houston, TX (US)

( * ) Notice: Subject to any disclaimer, the term of this patent is extended or adjusted under 35 U.S.C. 154(b) by 0 days.

(21) Appl. No.: 17/408,639

(22) Filed: Aug. 23, 2021

(65) Prior Publication Data

US 2021/0380399 A1 Dec. 9, 2021

Related U.S. Application Data

(60) Continuation of application No. 16/781,069, filed on Feb. 4, 2020, now Pat. No. 11,136,235, and a division (Continued)

(51) Int. Cl.

| | |
|---|---|
| ***B67D 7/78*** | (2010.01) |
| ***F16K 31/26*** | (2006.01) |
| ***B67D 7/36*** | (2010.01) |
| ***B67D 7/04*** | (2010.01) |
| ***B67D 7/52*** | (2010.01) |
| ***B67D 7/62*** | (2010.01) |
| ***B67D 7/72*** | (2010.01) |

(52) U.S. Cl.

CPC ................. *B67D 7/36* (2013.01); *B67D 7/04* (2013.01); *B67D 7/52* (2013.01); *B67D 7/62* (2013.01); *B67D 7/72* (2013.01)

(58) Field of Classification Search

CPC .......... B67D 7/0266; B67D 7/78; B67D 7/84; B67D 7/845; F16K 31/26

USPC .......................... 141/231–233; 137/122, 434

See application file for complete search history.

(56) References Cited

U.S. PATENT DOCUMENTS 2,083,629 A 6/1937 Zimmerer
2,756,767 A 7/1956 Lowery (Continued)

OTHER PUBLICATIONS

Office Action dated Oct. 7, 2021 in U.S. Appl. No. 17/067,091.

(Continued)

*Primary Examiner* — Paul J Gray

(74) *Attorney, Agent, or Firm* — Patterson + Sheridan, LLP

(57) ABSTRACT

Apparatus for delivering fluid to a fluid consuming asset having a fluid tank includes a tank operable to contain the fluid and a fluid delivery coupling fluidically coupling the tank to a manifold. A pressure relief valve is fluidically coupled to the manifold, disposed between the manifold and the tank, and coupled to the tank through a recirculation inlet. The pressure relief valve is set at a predetermined pressure threshold and opens when the back-pressure in the manifold exceeds that threshold. The fluid is directed to the tank through the recirculation inlet when the pressure relief valve opens. A fluid transporting mechanism is fluidically coupled to the manifold at a first distal end and a fill cap at a second distal end. The fill cap is coupled to an opening of the fluid tank and fluid can flow from the manifold to the fluid tank through the fluid transporting mechanism.

19 Claims, 9 Drawing Sheets

Related U.S. Application Data of application No. 16/237,965, filed on Jan. 2, 2019, now Pat. No. 10,865,096, and a continuation-in-part of application No. 16/171,180, filed on Oct. 25, 2018, now Pat. No. 10,850,969.

(56) References Cited

U.S. PATENT DOCUMENTS

| | | | | |
|---|---|---|---|---|
| 4,244,522 | A | 1/1981 | Hartwig | |
| 5,234,017 | A * | 8/1993 | Aslin | B67D 7/20 137/550 |
| 8,944,088 | B2 | 2/2015 | Gilmer | |
| 9,856,131 | B1 | 1/2018 | Moffitt, Jr. | |
| 9,890,026 | B1 * | 2/2018 | Bohamed | B67D 1/0004 |
| 10,017,374 | B1 | 7/2018 | Moffitt, Jr. | |
| 2008/0047606 | A1 | 2/2008 | Ross | |
| 2009/0139581 | A1 | 6/2009 | Herlihy | |
| 2014/0284921 | A1 | 9/2014 | van der Valk | |
| 2016/0076533 | A1 | 3/2016 | Moffitt | |
| 2016/0167806 | A1 * | 6/2016 | Rice | B64F 1/28 137/565.11 |
| 2017/0121002 | A1 | 5/2017 | Baker | |
| 2017/0275149 | A1 | 9/2017 | Schmidt | |
| 2017/0305736 | A1 | 10/2017 | Haile et al. | |
| 2019/0337795 | A1 | 11/2019 | Shock | |
| 2020/0002149 | A1 * | 1/2020 | Pickett | B08B 9/027 |

OTHER PUBLICATIONS

Office Action dated Oct. 29, 2021 in U.S. Appl. No. 16/809,176.
Office Action dated Jan. 16, 2020 in U.S. Appl. No. 16/171,180.
Office Action dated Jan. 16, 2020 in U.S. Appl. No. 16/237,965.
Office Action dated Apr. 16, 2020 in U.S. Appl. No. 16/171,180.
Office Action dated Aug. 20, 2020 in U.S. Appl. No. 16/171,180.
Office Action dated Jul. 8, 2021 in U.S. Appl. No. 17/067,091.
Office Action dated Jul. 8, 2021 in U.S. Appl. No. 16/809,176.
Office Action dated Feb. 23, 2022 in U.S. Appl. No. 16/809,176.

* cited by examiner

METHODS AND SYSTEMS FOR ON DEMAND FUEL SUPPLY

CROSS-REFERENCE TO RELATED APPLICATIONS

This application claims priority to and is a continuation of U.S. patent application Ser. No. 16/781,069, filed on, Feb. 4, 2020, which is a divisional of U.S. patent application Ser. No. 16/237,965, filed on Jan. 2, 2019, now U.S. Pat. No. 10,865,096 which claims priority to and is a continuation-in-part of U.S. patent application Ser. No. 16/171,180, filed on Oct. 25, 2018, now U.S. Pat. No. 10,850,969 and entitled "Improved Methods and Systems for On Demand Fuel Supply."

TECHNICAL FIELD

The present invention generally relates to the field of fluid delivery to one or more fluid consuming assets, and more particularly, to a method and system for efficiently and safely delivering fuel to a fuel consuming asset on demand.

BACKGROUND OF THE INVENTION

In many applications, it is often desirable to deliver fuel to a fuel consuming asset. The fuel consuming asset may be remotely located from the fuel source necessitating the need for transport and delivery of the fuel in a safe and efficient manner.

FIG. 1 shows a system for delivering fuel to one or more fuel consuming assets 102A, 102B, 102C in accordance with the prior art. A fuel tanker 104 carrying fuel is typically driven to a job site. One or more individuals 106 then manually deliver fuel to the fuel consuming assets 102A, 102B, 102C through a hose 108. In such prior art systems, fuel is delivered to the fuel consuming assets 102A, 102B, 102C one at a time by the individual 106 at the job site. Once the fuel consuming assets have been refueled, the fuel tanker 104 may be driven away. Each of the fuel consuming assets 102A, 102B, 102C is then continuously monitored to determine when they are running low on fuel again and the process must be repeated as needed until the work at the job site is completed.

Typical prior art fuel delivery systems have several shortcomings a non-exhaustive list of which follows. For example, manual delivery of fuel to the fuel consuming assets (one at a time) can be time consuming resulting in expenditure of valuable time and resources. Moreover, due to the manual nature of the fuel delivery process one or more assets may be missed in the process, especially in performance of a complex job at a job site which may involve the use of a plurality of fuel consuming assets.

Further, the prior art fuel delivery systems lack appropriate safety mechanisms and are prone to a risk of spills and leaks which are environmentally hazardous and can potentially cause fires at the job site. For example, a leak from the hose 108 can lead to fuel spillage since although shutting off a valve at the fuel tank 104 may stop fuel flow from the fuel tank 104 to the hose 108, the existing fuel in the hose 108 will continue to spill until the hose 108 is emptied. Additionally, valuable time and resources must be used to replace the hose 108 with another hose and to clean up the spilled fuel, not to mention the corresponding risk of fires at the job site. Operator error while dispensing fuel can likewise result in leaks and spills.

Additionally, depending on the nature of the job site, the manual delivery of fuel can be difficult resulting in tripping, falling or personal injury to the individual(s) delivering the fuel at the job site. The fact that personnel would have to monitor the fuel level in each fuel consuming asset throughout the refueling process in order to avoid over filling a fuel consuming asset further compounds this problem. Moreover, in instances where there are extreme weather conditions at the job site (which is not uncommon, especially in oil and gas applications) the individuals delivering the fuel who have to remain exposed to the elements during the refueling process may suffer heat exhaustion, dehydration or frost bite depending on the nature of the job site. Finally, in prior art systems, the fuel level in each of the fuel consuming assets should be continuously monitored to determine when the fuel level has reached below a threshold level and ensure fuel is delivered on a timely manner so that the fuel consuming asset does not run out of fuel.

Additionally, in certain prior art implementations fuel is pumped to a fuel consuming asset. However, at certain points during the operation, the rate at which fuel is consumed by the fuel consuming asset may be less than the rate at which fuel is delivered to the fuel consuming asset by the pump. For example, the rate at which the fuel consuming asset can receive the fuel may be less than the pump's minimum flow requirements. To address this problem, prior pumps typically included a bypass line to circulate the excess fuel back to the pump and avoid pressure build up. Specifically, any fuel delivered to the fuel consuming asset in excess of what the fuel consuming asset could receive would be recirculated back to the pump through the bypass line. However, as the fuel is recirculated through the pump to address the pressure build up the fuel heats up, ultimately damaging the pump.

There is therefore a need for a method and system to safely and efficiently deliver fuel to such fuel consuming assets that addresses these and other shortcomings of prior art fuel delivery systems.

SUMMARY

The present disclosure may comprise one or more of the following features and combinations thereof.

In accordance with one illustrative embodiment, the present disclosure is directed to a system for delivering a first fluid to a fluid consuming asset having a fluid tank. The system comprises a tank, wherein the tank contains the first fluid to be delivered to the fluid consuming asset and a manifold having a first inlet and one or more outlets. The first inlet of the manifold is fluidically coupled to an outlet of the tank through a fluid coupling and the first fluid flows from the tank into the manifold through the first inlet. A first pressure relief valve is disposed on the fuel delivery coupling between the outlet of the tank and the first inlet of the manifold. The first pressure relief valve is set at a first predetermined pressure threshold. The first pressure relief valve opens when the back-pressure in the fuel delivery coupling exceeds the first predetermined pressure threshold and the first fluid is directed back to the tank through a first re-circulation inlet when the first pressure relief valve opens. The system further comprises a spigot fluidically coupled to one of the one or more outlets of the manifold. A first distal end of the spigot is fluidically coupled to one of the one or more outlets of the manifold and a second distal end of the spigot is fluidically coupled to a fluid transporting mechanism. The fluid transporting mechanism comprises a first distal end fluidically coupled to the second distal end of the spigot and a second distal end. The system further comprises a fill cap having a connection plate, wherein the connection plate is coupled to an opening of a tank of a fluid consuming asset. The fill cap further comprises a hydraulic connector fluidically coupled to the second distal end of the fluid transporting mechanism and a probe disposed within the fluid tank of the fluid consuming asset. The probe comprises an inlet at a first distal end coupled to the connection plate and an outlet at a second distal end within the fluid tank. The inlet of the probe is fluidically coupled to the hydraulic connector and the fluid flows from the fluid transporting mechanism, through the hydraulic connector and into the probe through the probe inlet. The fluid flows into the fluid tank of the fluid consuming asset through the outlet of the probe.

In accordance with another illustrative embodiment, the present disclosure is directed to a method of delivering fuel to a fuel consuming asset having a fuel tank, the method comprising: filling a tank with the fuel; fluidically coupling the tank to a manifold through a fuel delivery coupling, wherein a first pressure relief valve is disposed between the tank and the manifold; fluidically coupling the manifold to a fluid transporting mechanism; fluidically coupling the fluid transporting mechanism to a hydraulic connector of a fill cap; coupling the fill cap to an opening of the fuel tank; directing the fuel from the first tank to the second tank through a first connection; pressurizing the second tank; directing the fuel from the second tank to the manifold through the fuel delivery coupling; turning on a valve on the spigot to allow fluid flow through the spigot; directing the fuel through the spigot into the fluid transporting mechanism; directing the fuel from the fuel transporting mechanism to the hydraulic connector of the fill cap; directing the fuel from the hydraulic connector into the fuel tank through an outlet of a probe of the fill cap; and stopping the flow of fuel out of the probe and into the fuel tank when a level of fuel in the fuel tank reaches a predetermined maximum level. In accordance with an illustrative embodiment of the present disclosure, the first pressure relief valve is set at a first predetermined pressure threshold, the first pressure relief valve opens when the back-pressure in the fuel delivery coupling exceeds the first predetermined pressure threshold, and the fuel is directed back to the tank through a first re-circulation inlet when the first pressure relief valve opens.

Further, in accordance with certain illustrative embodiments, fluidically coupling the manifold to a fluid transporting mechanism comprises fluidically coupling a spigot at an outlet of the manifold to the fluid transporting mechanism. Further, in accordance with certain illustrative embodiments, coupling the fill cap to the opening of the fuel tank comprises: inserting a first connecting member having an inner lip disposed within the fuel tank and an outer lip disposed outside the fuel tank through a first opening on a connection plate of the fill cap; inserting a second connecting member having an inner lip disposed within the fuel tank and an outer lip disposed outside the fuel tank through a second opening on the connection plate of the fill cap; and fastening a first fastener corresponding to the first connecting member and a second fastener corresponding to the second connecting member until the inner lip of the first connecting member and the inner lip of the second connecting member rest against a wall of the fuel tank.

The objects, advantages and other features of the present invention will become more apparent upon reading of the following non-restrictive description of a preferred embodiment thereof, given by way of example only with reference to the accompanying drawings. Although various features are disclosed in relation to specific exemplary embodiments of the invention, it is understood that the various features may be combined with each other, or used alone, with any of the various exemplary embodiments of the invention without departing from the scope of the invention.

BRIEF DESCRIPTION OF THE DRAWINGS

For a more complete understanding of the present invention and its features and advantages, reference is now made to the following description, taken in conjunction with the accompanying drawings, in which.

Figure 1:
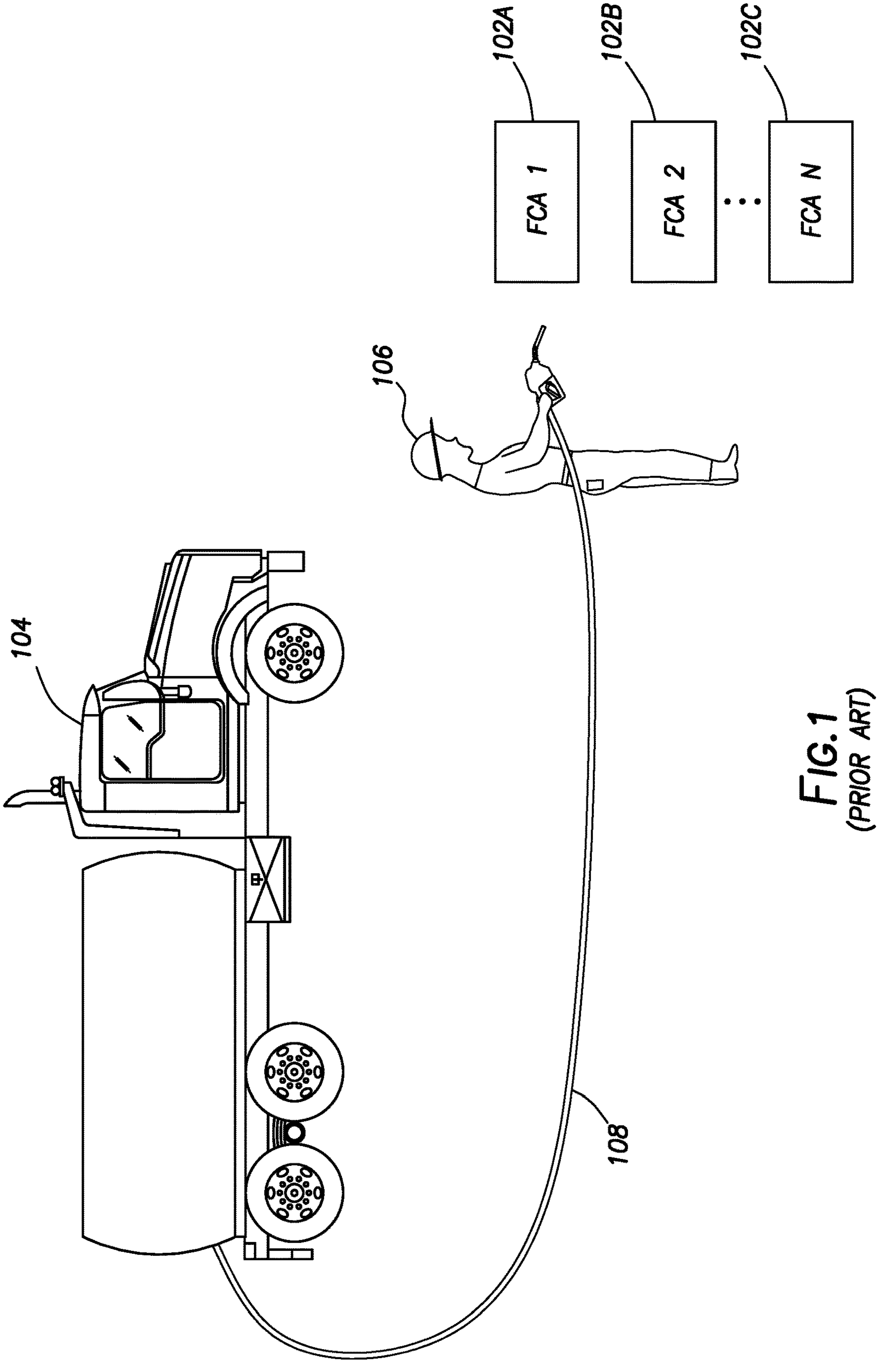
FIG. 1 (PRIOR ART)
FIG. 1 is a system for delivering fuel to fuel consuming assets in accordance with the prior art.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are illustrative examples only, and not exhaustive of the scope of the disclosure.

DESCRIPTION OF ILLUSTRATIVE EMBODIMENT(S)

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

As used herein, the terms "coupled" or "couple" include both a direct connection and an indirect connection between components. Similarly, the term "fluidically coupled" includes both a direct connection allowing fluid flow between two components as well as an indirect connection allowing fluid flow between two components. Further, in the figures and the description, like numerals are intended to represent like elements.

As used herein, the term "fuel consuming asset" includes any equipment or component of a system that consumes fuel and may need refueling on location. For example, the term "fuel consuming asset" includes any fuel consuming equipment having a fuel tank that is too small to hold sufficient fuel to complete the task at hand before refueling is required. The term "fuel consuming asset" further includes any fuel consuming equipment that needs to refuel "on-location" because, for example, it is remotely located or moving it to a fuel source to refuel is expensive, time consuming and/or otherwise inefficient. In one embodiment, the fuel consuming asset may be equipment used in oilfield applications such as, for example, equipment used in construction or development of oil and gas fields. The term "fuel consuming asset" may include a number of other equipment including, for example, irrigation pumps, emergency response generators, construction equipment, or any oilfield services equipment (e.g., fracturing equipment, etc.).

In one or more exemplary embodiments there is disclosed herein a new and improved Fueling On-Demand System and associated methods used to deliver fuel to a fuel consuming asset.

Figure 2:
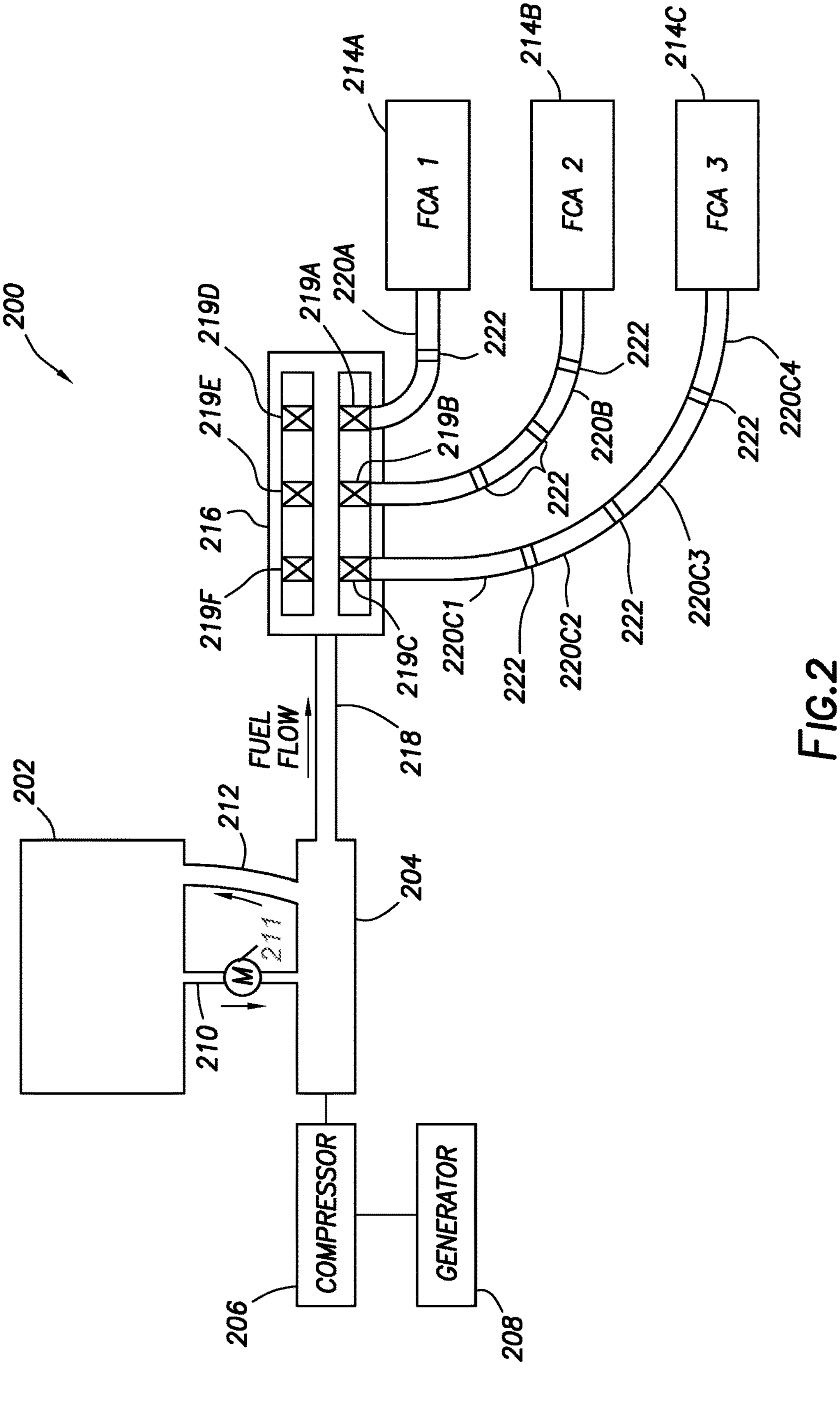
FIG. 2 is a system for delivering fuel to one or more fuel consuming assets in accordance with an exemplary embodiment of the present invention.

FIG. 2 is a system for delivering fuel to one or more fuel consuming assets on-demand in accordance with an exemplary embodiment of the present disclosure. The system 200 includes a first tank 202 and a second tank 204 fluidically coupled to the first tank 202.

The present invention is not limited to any specific volume for the first tank 202 and the second tank 204 and any suitable size for each tank may be used without departing from the scope of the presentation disclosure depending on the particular application. However, in certain illustrative embodiments, the first tank 202 may have a volume of approximately 20,000 gallons and the second tank may have a volume of in a range of approximately 6500 gallons to approximately 9000 gallons.

In accordance with an embodiment of the present invention, the second tank 204 is pressurized. The pressure of the second tank 204 may be set depending on the particular application and system requirements and the present disclosure is not limited to a specific pressure. However, in certain illustrative embodiments, the pressure of the second tank 204 may be in the range of approximately 45 psi to approximately 150 psi. Similarly, the operating pressure for the system may be set depending on the particular application and system requirements and the present disclosure is not limited to a specific pressure. However, in certain illustrative embodiments, the operating pressure of the system may be at a range of approximately 0 psi to approximately 150 psi.

Any suitable means known to those of ordinary skill in the art may be used to pressurize the second tank 204. In certain illustrative embodiments, a compressor 206 may be used to pressurize the second tank 204. The compressor 206 may be powered by a generator 208. As would be appreciated by those of ordinary skill in the art, having the benefit of the present disclosure, the generator 208 may be any suitable generator for the particular application including, but not limited to, a diesel-powered generator, a gas-powered generator, etc.

The first tank 202 and the second tank 204 are fluidically coupled through a first connection 210. The first connection 210 may be any suitable connection that would allow fluid flow between the first tank 202 and the second tank 204 including, but not limited to, a suitable hose or a suitable pipe. The first tank 202 contains the fuel to be delivered to the one or more fuel consuming assets 214A, 214B, 214C at the job site. The fuel flows from the first tank 202 to the second tank 204 through the first connection 210. In certain embodiments, the first connection 210 may be a metered connection and may include a metering module 211 to track the amount of fuel flowing from the first tank 202 to the second tank 204.

In certain illustrative embodiments, the first tank 202 and the second tank 204 may also be fluidically coupled through an optional second connection 212. The optional second connection 212 may also be any suitable connection that would allow fluid flow between the second tank 204 and the first tank 202 including, but not limited to, a suitable hose or a suitable pipe. The second connection 212 allows fuel to flow back from the second tank 204 to the first tank 202. Specifically, the second connection 212 provides a recirculation path for fuel flow between the second tank 204 and the first tank 202 such that excess fuel from the second tank 204 can return to the first tank 202. In this manner, the second connection 212 helps facilitate the constant supply of fuel under the pressure from the compressor 206 from the second tank 204 to the fuel consuming assets 214.

The second tank 204 is fluidically coupled to a manifold 216 and the pressurized fuel from the second tank 204 may flow to the manifold 216 through a fuel delivery coupling 218. Specifically, the air pressure from the compressor 206 forces the fuel from the second tank 204 through the fuel delivery coupling 218 into the manifold 216. The manifold 216 includes an inlet (shown in FIG. 3) allowing the fuel to flow therein through the fuel delivery coupling 218. In certain illustrative embodiments, the flow of fuel through the fuel delivery coupling 218 may be metered. For instance, an inline flow meter (not shown) may be used to monitor fluid flow through the fuel delivery coupling 218.

The manifold 216 further includes a plurality of outlets 219A, 219B, 219C, 219D, 219E, 219F. The number of outlets 219 shown in the figures of the present disclosure is for illustrative purposes only and the present disclosure is not limited to any particular number of outlets 219 for the manifold 216. Accordingly, as would be appreciated by those of ordinary skill in the art having the benefit of the present disclosure, fewer or more outlets 219 may be used depending on the particular implementation and system requirements. The details of structure and operation of the manifold 216 is discussed further in conjunction with FIGS. 3A, 3B and 4.

Each outlet 219 (or a subset thereof) of the manifold 216 may be fluidically coupled to a corresponding fuel consuming asset 214A, 214B, 214C via a fluid transporting mechanism. Specifically, a first distal end of the fluid transport mechanism may be fluidically coupled to an outlet 219 of the manifold 216 and a second distal end of the fluid transporting mechanism may be fluidically coupled to the fuel consuming asset. In certain implementation (as shown in FIG. 2), not all outlets 219 of the manifold 216 may be utilized depending on the particular application. For instance, in the illustrative embodiment of FIG. 2, three of the outlets 219A, 219B, 219C are fluidically coupled to corresponding fuel consuming assets 214A, 214B, 214C while the remaining three outlets 219D, 219E, 219F are unused. In accordance with certain implementation, the fluid transporting mechanism may be a hose 220A, 220B, 220C that may be used to fluidically couple each outlet 219A, 219B, 219C to a corresponding fuel consuming asset 214A, 214B, 214C. In other embodiments, other suitable fluid transporting mechanisms may be used to fluidically couple an outlet 219 of the manifold 216 to a fuel consuming asset 214. For example, in certain illustrative embodiments, an outlet 219 of the manifold 216 may be coupled to a fuel consuming asset 214 using an aluminum pipe or a hard steel pipe.

In accordance with certain illustrative embodiments, the hose 220 that fluidically couples a manifold outlet 219 to a fuel consuming asset 214 may optionally be made of rubber or steel. Moreover, in certain embodiments, the hose 220 may be disposed within a Kevlar sleeve to diffuse static electricity and avoid risks (e.g., fire) associated with static electricity. In accordance with certain illustrative embodiments, the hose 220 may be a segmented hose as shown in FIG. 2. Specifically, the hose 220C may have two or more segments (e.g., 220C1, 220C2, 220C3, 220C4) detachably coupled together (i.e., may be removable from one another) allowing a user to selectively decouple each segment from the other as desired. In certain illustrative embodiments, the length of each hose segment 220C1, 220C2, 220C3, 220C4 may be in a range of approximately 50 ft to approximately 200 ft, although, other lengths may be used as desired without departing from the scope of the present disclosure. Although the segmented hose configuration is discussed in detail in conjunction with the hose 220C, other hoses (e.g., 220A, 220B) may likewise be segmented having a similar configuration. Moreover, although the segmented configuration is discussed in detail in conjunction with the implementation using a hose as the fluid transporting mechanism, the same configuration may likewise be implemented when using any other fluid transporting mechanism.

The hose segments 220C1, 220C2, 220C3, 220C4 may be detachably coupled using any suitable means for the particular application such as, for example, a threaded connection, a hydraulic dry break coupling, or cam locks. In certain illustrative embodiments, the hose segments 220C1, 220C2, 220C3, 220C4 may be coupled using a hydraulic dry break coupling 222. In certain embodiments, the hydraulic dry break coupling 222 may be hydraulically crimped to an open end of the first hose segment 220C1 and the last hose segment 220C4 and to each distal end of the remaining hose segments 220C2, 220C3. The structure and operation of a hydraulic dry break coupling 222 is known to those of ordinary skill in the art, having the benefit of the present disclosure, and will therefore not be discussed in detail herein. The hydraulic dry break coupling 222 between the hose segments 220C1, 220C2, 220C3, 220C4 allows the operator to selectively decouple the hose segments 220C1, 220C2, 220C3, 220C4 from each other throughout the process as needed without any fuel spillage. Specifically, the use of a segmented hose 220 in accordance with the illustrative embodiments of the present disclosure allows the fuel to be contained in detachable compartments (i.e., the individual hose segments) within the hose 220.

The use of a segmented hose 220 has a number of advantages. For example, in the event of a leak from any particular segment of the hose 220 the operator can disconnect the leaking hose segment from its adjacent hose segments upstream and downstream in order to prevent and/or at least limit fuel spillage. Moreover, the operator can readily replace a damaged segment of a hose 220 without the need to remove and replace the whole hose. Additionally, the length of the hose can be readily increased or reduced depending on the particular implementation by selectively adding hose segments or removing hose segments as desired without the need to replace one hose with another as needed for the particular application or for each given fuel consuming asset. Other advantages of using a segmented hose would become evident to those of ordinary skill in the art having the benefit of the present disclosure.

Figure 3A:
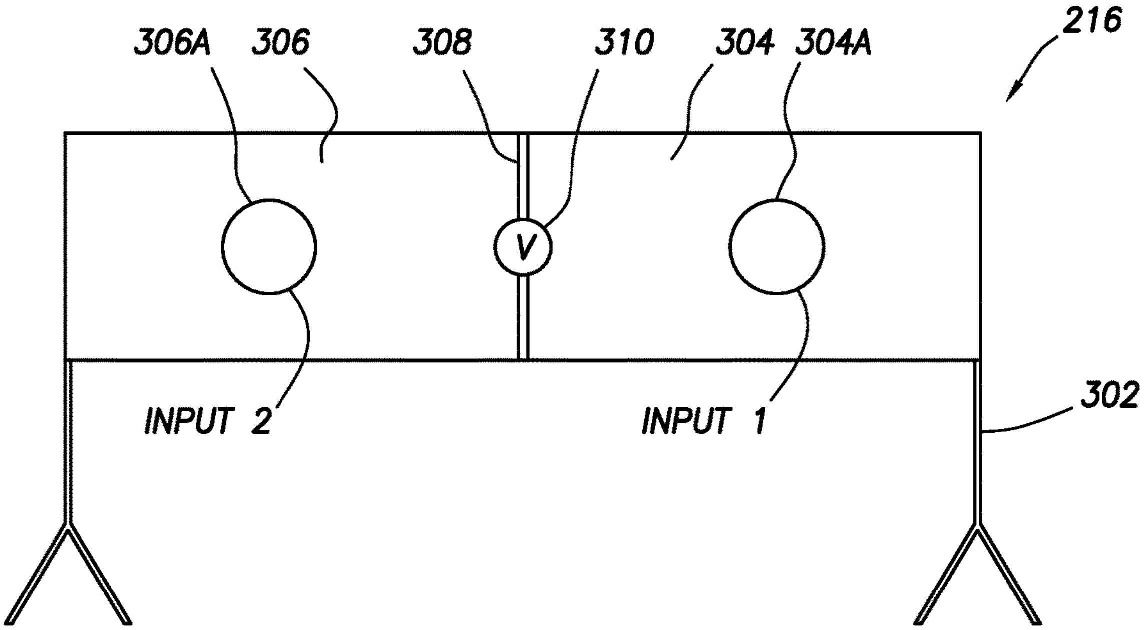
FIG. 3A is a rear view of a manifold of a fuel delivery system in accordance with an exemplary embodiment of the present disclosure.
Figure 3B:
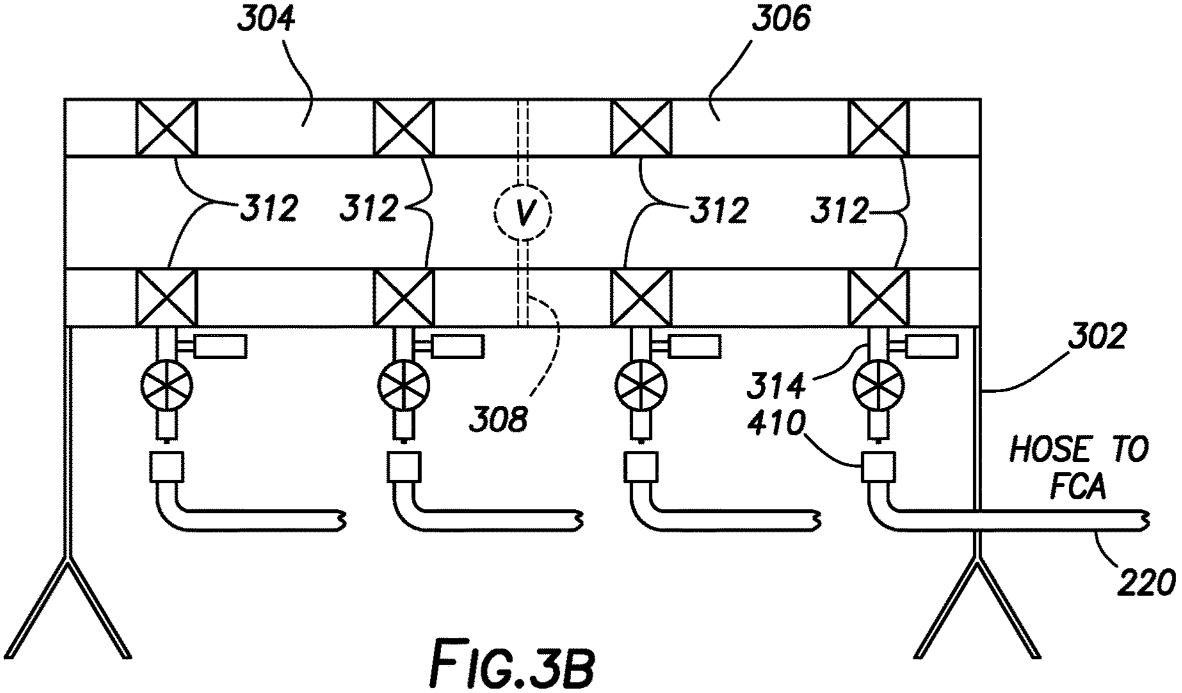
FIG. 3B is a front view of a manifold of a fuel delivery system in accordance with an exemplary embodiment of the present disclosure.

FIGS. 3A and 3B depict the rear view and the front view, respectively, of a manifold 216 of a fuel delivery system in accordance with an exemplary embodiment of the present disclosure. In the illustrative embodiment of FIG. 3, the manifold 216 is mounted on a stand 302. However, the present disclosure is not limited to this specific implementation and the manifold 216 may be positioned at a job site in a number of other ways as desired for the particular application and job requirements. For instance, in certain implementations, the manifold 216 may be mounted onto a trailer or may be attached on the same trailer that is carrying the first tank 202 or the second tank 204. Alternatively, the manifold 216 may be a stand-alone component exposed to the elements at the job site.

In the illustrative embodiment of FIG. 3A, the manifold 216 may comprise of a first compartment 304 having a corresponding inlet 304A and a second compartment 306 having a corresponding inlet 306A. The two compartments 304, 306 may be separated by a divider (e.g., a wall or a baffle) 308 which includes a valve 310. The valve 310 may be any suitable valve for the particular application including, but not limited to, a ball valve or a butterfly valve. The valve 310 may be opened and closed to selectively combine or separate the first compartment 304 and the second compartment 306. Stated otherwise, the valve 310 allows an operator to decide whether to use the manifold 216 to distribute one type of fuel (one compartment implementation) or two distinct types of fuel (two compartment implementation).

For instance, in certain implementations, it may be desirable to supply both clear fuel and dyed fuel at a job site. Accordingly, the operator may close the valve 310 and effectively divide the manifold 216 into two distinct compartments 304, 306 separated by the divider 308. The inlet 304A, 306A of one of the compartments 304, 306 may then be fluidically coupled to a fuel delivery coupling (such as the fuel delivery coupling 218 of FIG. 2) from a clear fuel source (e.g., clear diesel) and the inlet 304A, 306A of the other compartment 304, 306 may be fluidically coupled to a fuel delivery coupling from a dyed fuel source (e.g., dyed diesel). In such a two-compartment implementation, in accordance with an illustrative embodiment of the present disclosure, each fuel delivery coupling delivering fluid to each compartment of the manifold 216 would then be fluidically coupled to a corresponding first tank and a second pressurized tank configured as described in conjunction with FIG. 2. The operator can then deliver two different types of fuel from the same manifold 216. In contrast, if the manifold is to be used to deliver a single type of fuel (e.g., only clear fuel or only dyed fuel) the valve 310 may be opened combining the two compartments 304, 306. One or both inlets 304A, 306A may then be fluidically coupled to a fuel delivery coupling (such as the fuel delivery coupling 218 of FIG. 2) as desired and the manifold 216 can deliver the fuel contained therein to the fuel consuming assets 214 as described in further detail below. Finally, in certain illustrative embodiments, the valve 310 may be closed dividing the manifold into two compartments 304, 306 but nevertheless, only one of the compartments 304, 306 may be used to deliver a single fuel at a job site through the manifold 216.

Although the illustrative embodiments of the present disclosure are described in conjunction with delivering fuel to a fuel consuming asset, one of ordinary skill in the art having the benefit of the present disclosure would readily understand that the present invention is not limited to this particular application. Specifically, the methods and systems disclosed herein may be used to delivery any fluid to any system. Accordingly, depending on the particular application and implementation, the manifold 216 may have more than two compartments similarly separated by dividers and valves as described in conjunction with FIGS. 3A and 3B. In such implementations, the same manifold may be used to deliver two or more fluids to a plurality of fluid receptacles or fluid consuming assets.

Moreover, the use of the divider 308 and the valve 310 is optional. For instance, in certain illustrative embodiments, the manifold 216 may be designed to be a single compartment and it may not include a divider 308 if the operator intends to use it to deliver only one type of fluid (e.g., only clear fuel). Similarly, depending on the particular application and implementation, the system may include a divider 308 but not a valve 310 to selectively combine and separate the two compartments 304, 306 of the manifold 216.

FIG. 3B depicts a frontal view of the manifold 216 in accordance with an illustrative embodiment of the present disclosure. The manifold 216 includes a plurality of outlets 312. One or more outlets 312 of the manifold 216 may include a corresponding spigot 314 which dispenses fuel. The structure and operation of the spigot 314 is discussed in further detail below in conjunction with FIG. 4. The manifold 216 may include any number of outlets 312 and spigots 314 as desired for the particular implementation. Moreover, the size of the outlets 312 and the spigots 314 may be varied depending on the particular application and implementation. Accordingly, the size and number of outlets 312 and spigots 314 shown in FIG. 3B is for illustrative purposes only and is not intended to be limiting. Additionally, as shown in the illustrative embodiments of FIGS. 3A and 3B, in instances where the manifold 216 includes a divider 308, the number of outlets 312 corresponding to each compartment 304, 306 may be the same or may be different (as in FIGS. 3A and 3B). Moreover, the manifold 216 may include one or more outlets 312 that are unused (i.e., either not connected to a spigot 314 or connected to a spigot 314 that is turned "off" as described below).

In implementations where the manifold 216 is a single compartment (i.e., there is no divider wall 308 or the valve 310 is open allowing fluid flow between the compartments 304, 306), all spigots 314 dispense the same fluid (e.g., they all dispense clear fuel or they all dispense dyed fuel). In contrast, in implementations where the manifold comprises of two compartments (i.e., there is a divider wall 308 with no valve 310 or the valve 310 is closed prohibiting fluid flow between the compartments 304, 306), a first group of spigots 314 corresponding to the first compartment 304 may dispense a first fluid (e.g., clear fuel) and a second group of spigots 314 corresponding to the second compartment 306 may dispense a second fluid (e.g., dyed fuel).

Figure 4:
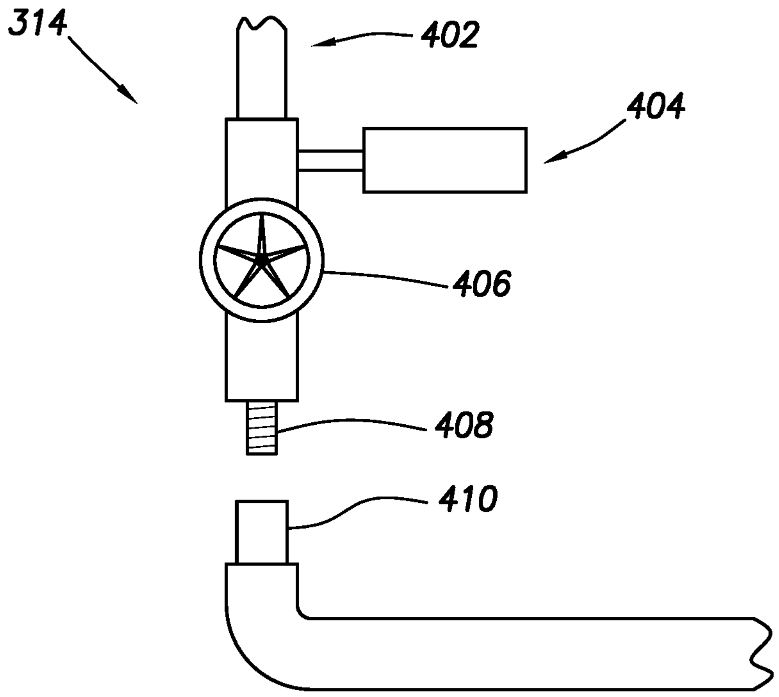
FIG. 4 is a close-up view of a spigot used in a manifold of a fuel delivery system in accordance with an exemplary embodiment of the present disclosure.

FIG. 4 is a close-up view of a spigot used in a manifold of a fuel delivery system in accordance with an exemplary embodiment of the present disclosure. Specifically, FIG. 4 depicts a spigot 314 used at an outlet 219 of the manifold 216 in accordance with an illustrative embodiment of the present disclosure. The spigot 314 comprises a nipple 402 which couples the spigot 314 to the outlet 219 of the manifold 216. The nipple 402 is fluidically coupled to a valve 404 which may be any suitable valve such as, for example, a ball valve. The valve 404 may be selectively opened and closed to allow or prohibit fluid flow from the manifold 216 to a fuel consuming asset 214 through the spigot 314. The spigot 314 may further include a visual flow indicator 406 fluidically coupled to the valve 404. As would be appreciated by those of ordinary skill in the art, having the benefit of the present disclosure, the visual flow indicator 406 may be used to visually verify whether fuel is flowing out through the spigot 314 or not. The visual flow indicator 406 is in turn fluidically coupled to a connection member 408. The connection member 408 mates with a corresponding connection member 410 on the hose 220. The connection member 408 used may be any suitable connection member such as, for example, a threaded connection or cam locks. In certain illustrative implementation, the connection between the spigot 314 and the hose 220 may be a threaded connection. For instance, the connection member 408 of the spigot 314 may be a male connection and the connection member 410 on the hose 220 may be a female connection.

In certain implementations, the spigot 314 may also include an inline flow meter (e.g., a digital inline meter) (not shown) to monitor the fluid flow to a given fuel consuming asset 214 through the manifold 216. The inline flow meter may be placed at any point between the valve 404 and the hose 220.

Accordingly, the operator can selectively open and close the valve 404 to allow fluid flow out of any given outlet 219 of the manifold 216 through the corresponding spigot 314 into a hose 220 that is fluidically coupled to a given fuel consuming asset 214.

Figure 5A:
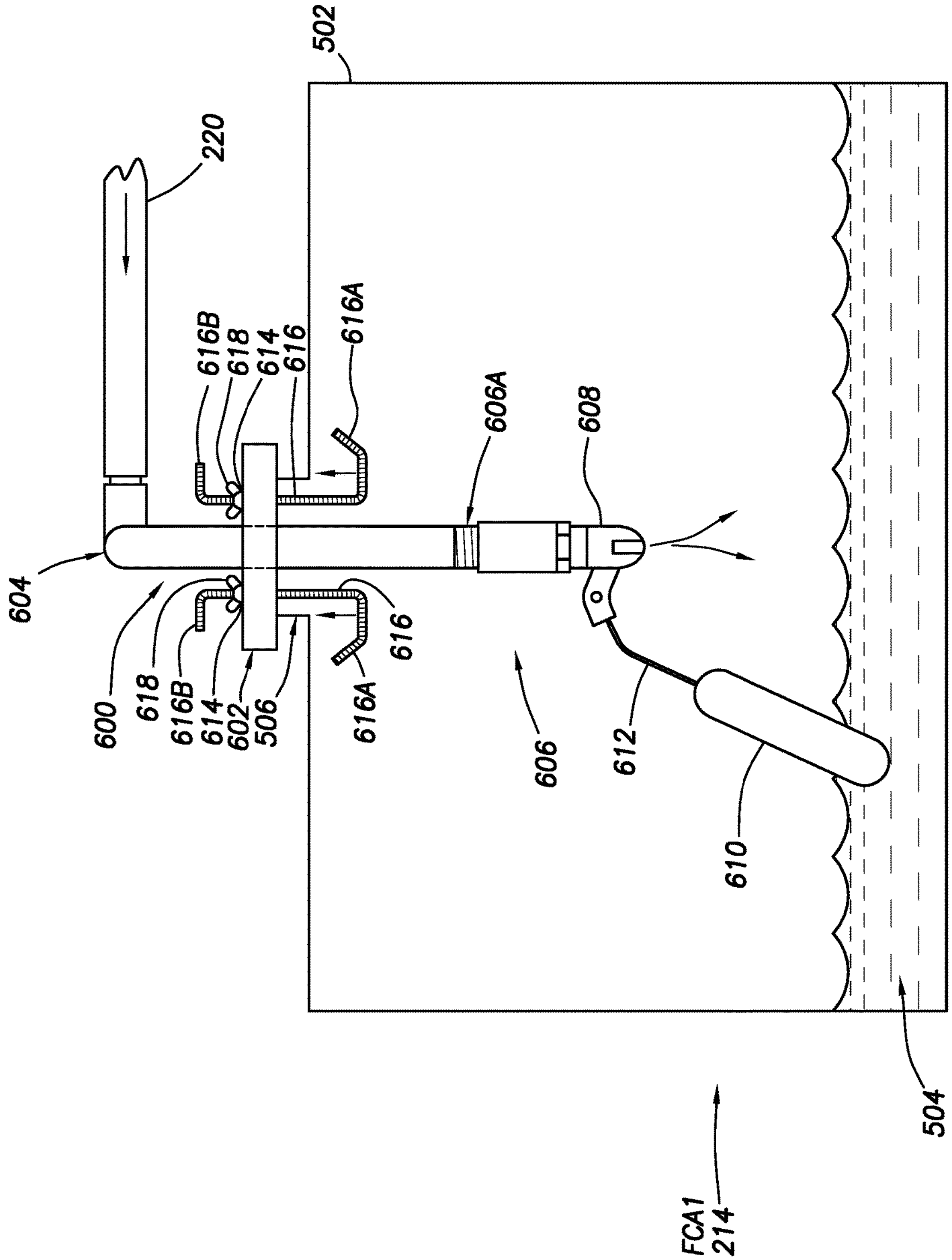
FIG. 5A is a cross-sectional view of the mechanism for connecting the disclosed fuel delivery system to a fuel tank of fuel consuming asset with the connecting members not fastened in accordance with an exemplary embodiment of the present disclosure.

FIG. 5A depicts a cross-sectional view of the mechanism for connecting the disclosed fuel delivery system to a fuel tank of a fuel consuming asset with the connecting members not fastened in accordance with an exemplary embodiment of the present disclosure. Specifically, the figure depicts an improved connection mechanism for fluidically coupling the hose 220 to the fuel consuming asset 214 in accordance with an illustrative embodiment of the present disclosure. The fuel consuming asset 214 includes a fuel tank 502 which may contain a certain amount of fuel 504. The fuel is dispensed into the fuel tank 502 from the hose 220 through a fuel tank opening 506. A new and improved fill cap 600 is used to fluidically couple the hose 220 to the fuel tank opening 506. The structure and operation of the fill cap 600 is discussed in further detail below.

Figure 6:
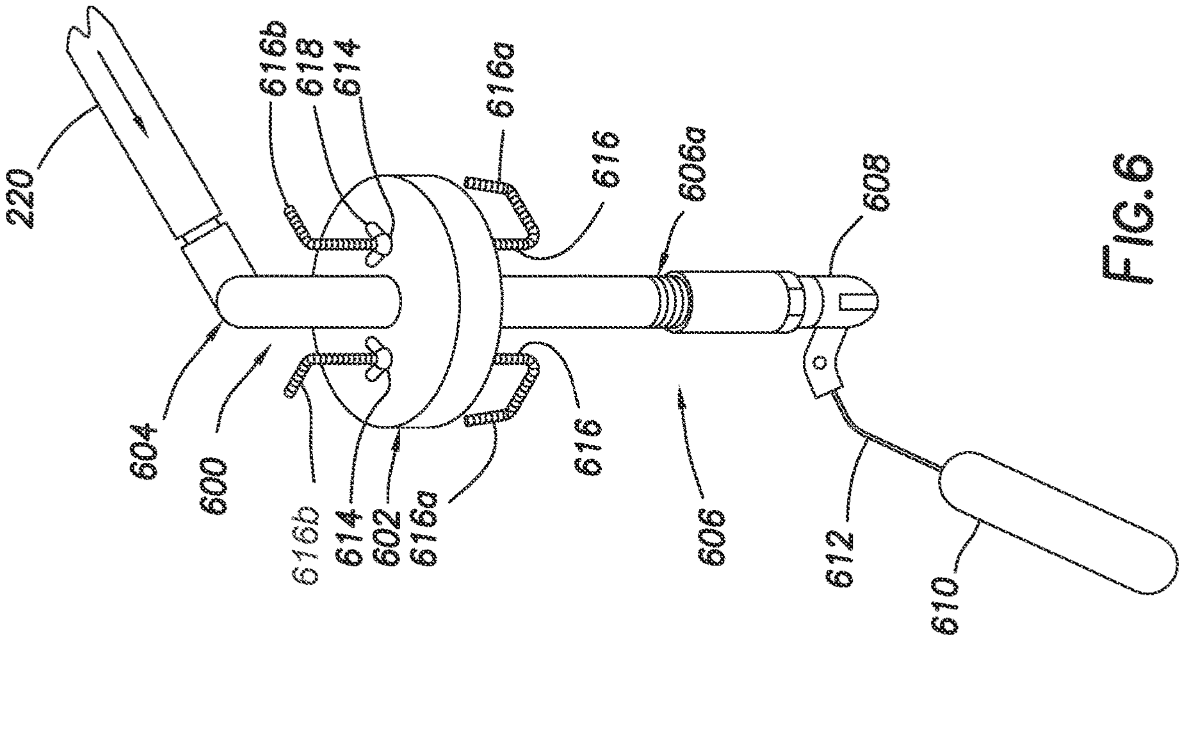
FIG. 6 is a perspective view of a fill cap in accordance with an exemplary embodiment of the present disclosure.

FIG. 6 is a perspective view of a fill cap 600 in accordance with an exemplary embodiment of the present disclosure. Specifically, FIG. 6 depicts the details of the structure of a fill cap 600 in accordance with an illustrative embodiment of the present disclosure. The fill cap 600 includes a connection plate 602 that rests on the fuel tank opening 506 and may be used to couple the fill cap 600 to the fuel tank 502. The connection plate 602 may be made from any suitable materials for the particular application including, but not limited to, aluminum, wood, steel, plexiglass, or any synthetic material deemed suitable for the particular implementation. In certain implementations, the use of clear materials (e.g., plexiglass) may be beneficial as it allows for visual inspection of fuel delivery and fuel levels within a fuel tank 502 of a fuel consuming asset 214.

The connection plate 602 of the present invention is designed to be easily couplable to fuel tanks having different fuel tank opening sizes. Specifically, in one illustrative embodiment, the connection plate 602 includes two openings 614. A connecting member 616 may be inserted through each opening 614. In one embodiment, the connecting member 616 may be a "J" shaped or a "C" shaped connecting member. In certain implementations, it is advantageous to use a "C" shaped connecting member 616 so that the user can determine the location of the inner lip 616A of the connecting member 616 disposed within the fuel tank 502 based on the location of the outer lip 616B of the connecting member 616 which is disposed outside the fuel tank 502 and is therefore visually accessible and can be observed by the operator.

Figure 5B:
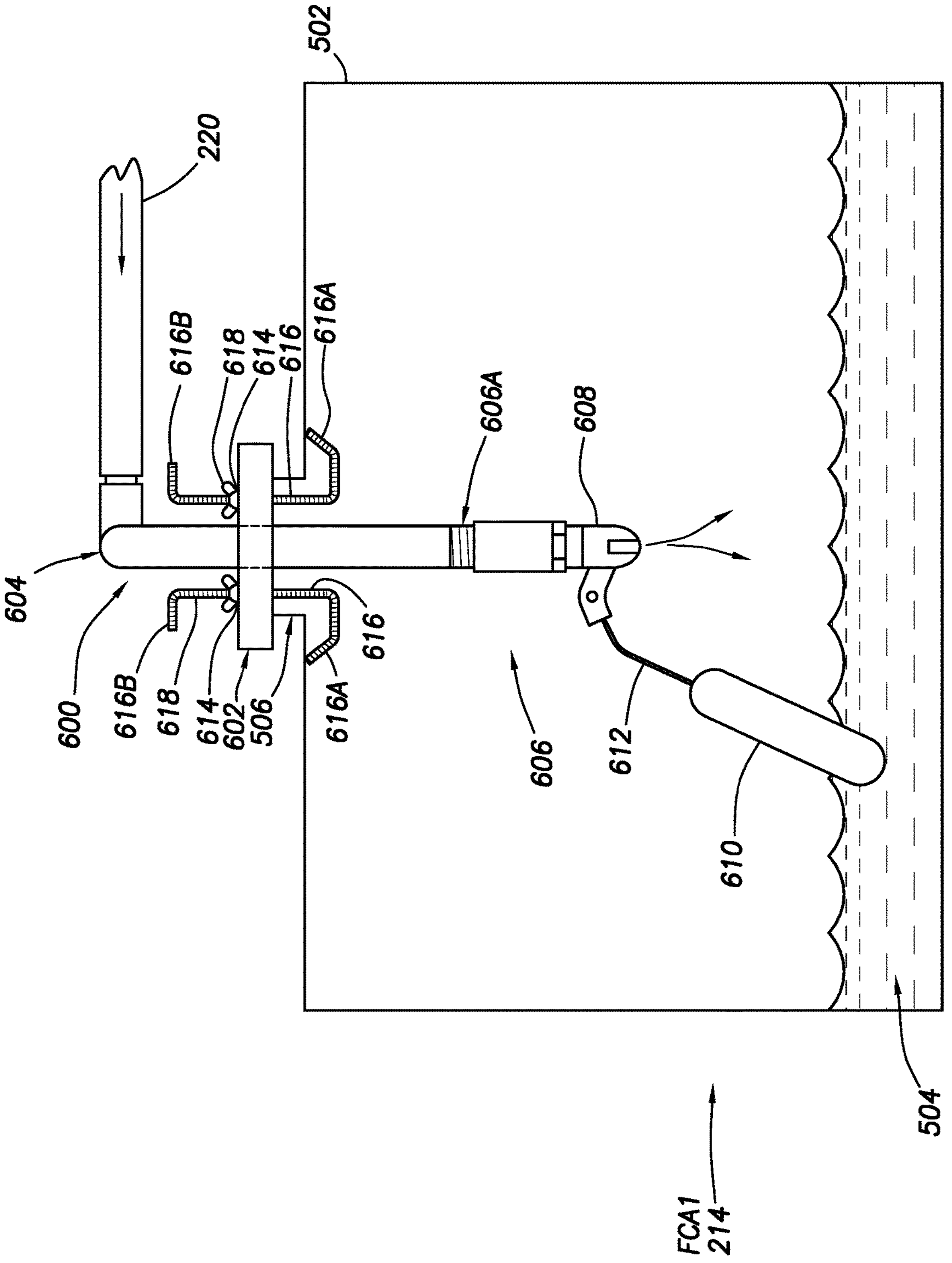
FIG. 5B is a cross-sectional view of the mechanism for connecting the disclosed fuel delivery system to a fuel tank of fuel consuming asset with the connecting members fastened in accordance with an exemplary embodiment of the present disclosure.

The connecting member 616 may be made of any suitable material for the desired application including, but not limited to, steel, plastic, or stainless steel. In certain embodiments, all or part of the connecting member 616 may be threaded. Once the connecting member 616 is inserted through the opening 614 on the connection plate 602, a fastener 618 may be used to fasten the connecting member 616 such that it couples the connection plate 602 to the fuel tank opening 506. Specifically, in one embodiment, the fastener 618 may be a nut that is coupled to threads on the connecting member 616. Any suitable nut may be used as the fastener 618. For instance, in certain embodiments, the fastener 618 may be a wing nut. As the fastener 618 is tightened on the connecting member 616, the connecting member 616 moves upwards (i.e., the inner lip 616A moves towards the connection plate 602) through the opening 614 in the connection plate 602 until it has moved enough for the inner lip 616A of the connecting member 616 disposed within the fuel tank 502 to rest against the wall of the fuel tank 502 as shown in FIG. 5B. At this point, the connecting member 616 holds the fill cap 600 in place against the fuel tank 502 while the fueling operation is performed.

Although two openings 614 and two corresponding connecting members 616 are shown in the illustrative embodiment of FIG. 5, the present disclosure is not limited to any specific number of openings 614 and connecting member 616 for the connection plate 602. Accordingly, in other embodiments, any number of openings 614 and connecting members 616 may be used to couple the connection plate 602 to the fuel tank opening 506 as desired.

Figure 7:
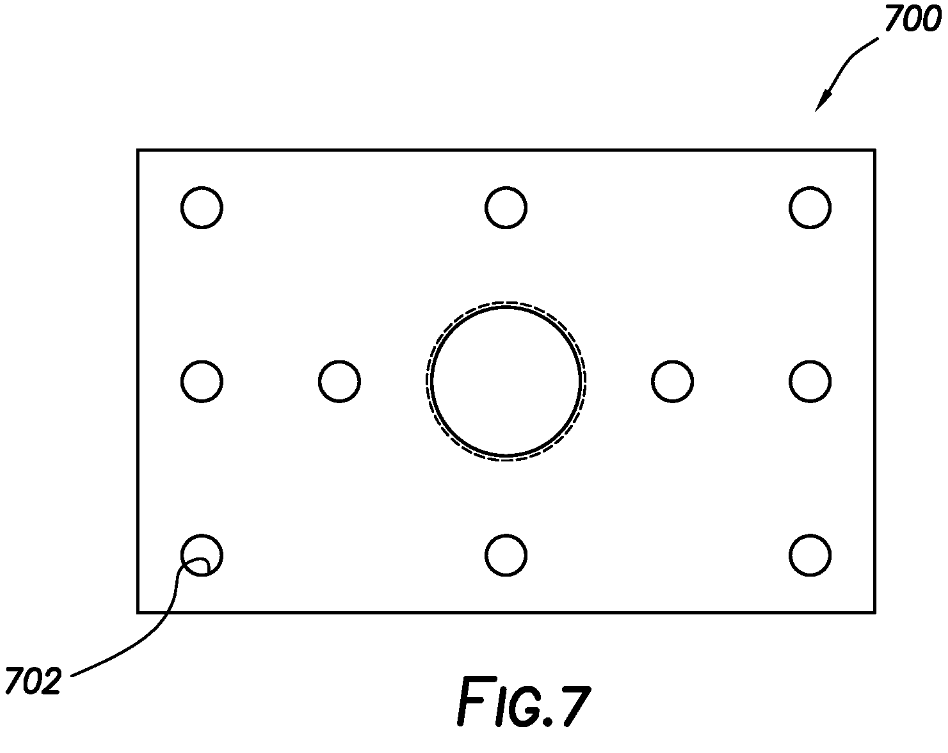
FIG. 7 is a top view of a connection plate of a fill cap in accordance with an exemplary embodiment of the present disclosure.

FIG. 7 is a top view of a connection plate of a fill cap in accordance with another exemplary embodiment of the present disclosure. Specifically, FIG. 7 shows a connection plate 700 for the fill cap 600 in accordance with another illustrative embodiment of the present disclosure. In certain embodiments, the connection plate 700 may have a plurality of openings 702 for the potential insertion of a connecting member. Accordingly, depending on the size of the opening of a given fuel tank at the fuel consuming asset, the user can select the openings 702 that are at a suitable distance from each other for the insertion of the connecting members therein. Once the appropriate openings are selected, the connecting members are inserted therein and fastened as explained above in order to couple the connection plate 700 (and therefore, the fill cap 600) to the fuel tank at the fuel tank opening.

In certain implementations, the connection plate 700 (or 602) may be made of any drillable material such as, for example, plexiglass, hardened plastic, hard rubber, wood, aluminum, or any other suitable material that can be readily impaled at the job site. Accordingly, the suitable distance of openings for the insertion of connecting members to attach the fill cap 600 to a particular tank having a particular tank opening size may be determined at the job site on the fly. Specifically, in such embodiments, the user may determine the appropriate location for the openings on the connecting plate at the job site depending on the size of the opening on the fuel tank to be refueled. The user can then drill the openings at the appropriate location on the connection plate for the insertion of the connecting member such that the distance between the connecting members is sufficient to allow the inner lip of the connecting members to hold the connection plate (and hence, the fill cap) in place once the fastener is tightened. This coupling mechanism is advantageous because it allows the fill cap 600 to be coupled to fuel tanks having varying fuel tank opening sizes. In this implementation, the present disclosure facilitates a custom positioning of the connecting member allowing the coupling of the fill cap 600 to standard and nonstandard size fuel tank openings for safe and effective securement.

Now turning back to FIG. 6, a hydraulic connector 604 is disposed on a first side of the connection plate 602. The hydraulic connector 604 can be fluidically coupled to the hose 220 which is delivering fuel from a spigot 314 of the manifold 216. Any suitable connection mechanism may be used to fluidically couple the hydraulic connector 604 of the fill cap 600 with the hose 220. In certain illustrative embodiments, the connection between the hydraulic connector 604 and the hose 220 is a threaded connection. In certain illustrative embodiments, the hydraulic connector 604 may comprise of a male hydraulic fitting that mates with a female hydraulic fitting disposed on the distal end of the hose 220. In certain illustrative embodiments, the hydraulic connector 604 is approximately L-shaped and is coupled to the connection plate 602. In certain illustrative embodiments, the connection plate 602 may include a threaded opening thereon and the hydraulic connector 604 is coupled to the connection plate 602 by coupling a distal end of the hydraulic connector 604 (opposite to the point of connection with the hose 220) with the threaded opening on the connection plate 602.

A probe 606 extends from a second side of the connection plate 602. The probe comprises an inlet at a first distal end coupled to the connection plate 602 and an outlet at a second distal end. The outlet of the probe 606 is disposed within the fuel tank 502. The probe 606 is fluidically coupled to the hydraulic connector 604 such that the fuel delivered to the hydraulic connector 604 through the hose 220 flows into the inlet of the probe 606 through the opening in the connection plate 602. The fuel then passes through the probe 606 and is dispensed into the fuel tank 502 through the probe outlet. In certain illustrative embodiment, the probe 606 may be selectively extendable and retractable. For instance, in certain illustrative embodiments, the probe 606 may be telescopically extendable and retractable. In other embodiments, the probe 606 may comprise of one or more segments coupled through a threaded collar or joint (shown at 606A). The user may then selectively increase or reduce the length of the probe 606 depending on the particular application and implementation by adding or removing one or more segments to the probe 606 as desired. The ability to selectively extend and retract the length of the probe 606 in this manner is beneficial as it allows the operator to easily adjust the manner of delivery of fuel to the fuel tank 502 on the fly by adjusting the position of the point of fuel delivery within the fuel tank 502. The probe 606 may be made from any suitable material including, but not limited to, steel, copper, hard rubber, or aluminum.

In certain illustrative embodiments, a valve 608 may be disposed at a second distal end of the probe 606 and may be coupled thereto in order to control the fluid flow out of the outlet of the probe 606. The valve 608 is operable to selectively open and close the outlet of the probe 606 to control the delivery of fuel to the fuel tank 502. Specifically, the valve 608 is movable between an open position and a closed position such that fuel does not flow out of the outlet of the probe 606 when the valve is in the closed position. In contrast, with the valve 608 in the open position, fluid flows out of the outlet of the probe 606.

The valve 608 may be any suitable valve for the particular application such as, for example, a foot valve or a Hudson valve. In certain illustrative embodiments, an arm 612 is operable to open and close the valve 608. Specifically, the arm 612 may couple the valve 608 to a float 610. In certain illustrative embodiments, the arm 612 may be made of stainless steel. The float 610 may be made from any suitable material for the particular application including, but not limited to, aluminum, foam, plastic, or wood.

Figure 5C:
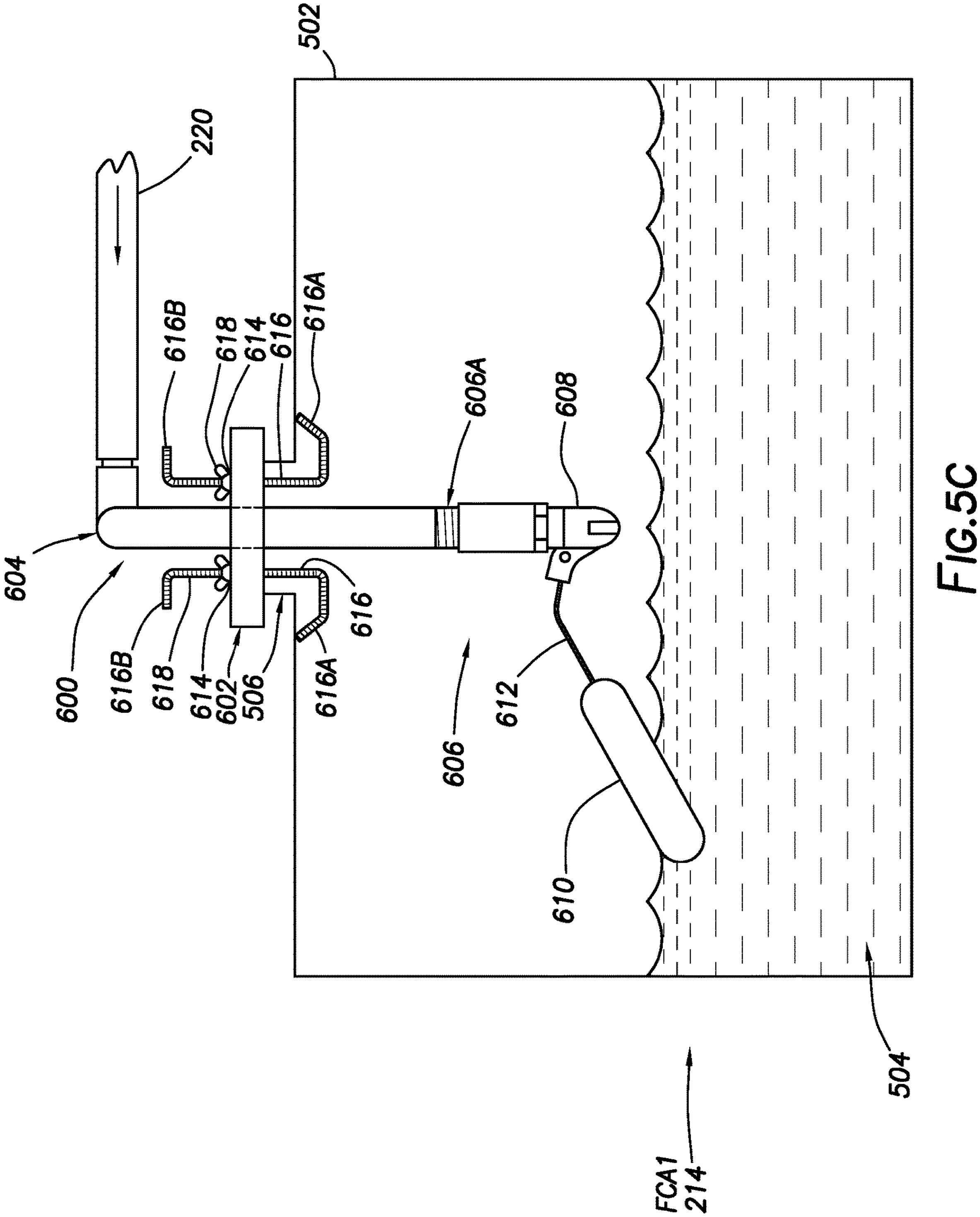
FIG. 5C is a cross-sectional view of the mechanism for connecting the disclosed fuel delivery system to a fuel tank of fuel consuming asset with the connecting members fastened, where the fuel level has reached the "maximum level" and fuel delivery has ceased in accordance with an exemplary embodiment of the present disclosure.

As fuel is added to the fuel tank 502 through the probe 606, the level of fuel 504 in the fuel tank 502 rises, moving the float 610 up. As the float 610 moves up, it moves the arm 612, in turn moving the valve 608. Finally, once the fuel 504 rises to a predetermined "maximum" level, the float 610 moves the arm 612 such that the arm 612 closes the valve 608 as shown in FIG. 5C, ceasing the delivery of fuel to the tank 502. Stated otherwise, when the float 610 moves to a position corresponding to the predetermined "maximum" fuel level for the particular fuel tank 502, the arm 612 shuts down the valve 608, thereby stopping fuel flow into the fuel tank 502. As fuel is consumed and the fuel level in the fuel tank 502 goes back down, the float 610 moves down along with the fuel level, reopening the valve 608 and automatically resuming fuel delivery to the fuel tank 502. Accordingly, fuel is delivered by the disclosed system on continuous or "on-demand" basis in accordance with the particular asset's individual fuel consumption and/or "burn rate" without the need for any user intervention.

Additionally, the new and improved probe design disclosed herein provides an automated mechanism to shut down the delivery of fuel to the fuel tank 502 of each fuel consuming asset 214A, 214B, 214C, virtually eliminating the risk of fuel overflow and spillage. Moreover, the methods and systems disclosed herein eliminate the need for personnel to monitor the fuel level during fuel delivery at the one or more fuel consuming assets on the job site thereby improving the efficiency of the refueling process and reducing the associated time, risk of exposure or injury, and costs.

Figure 8:
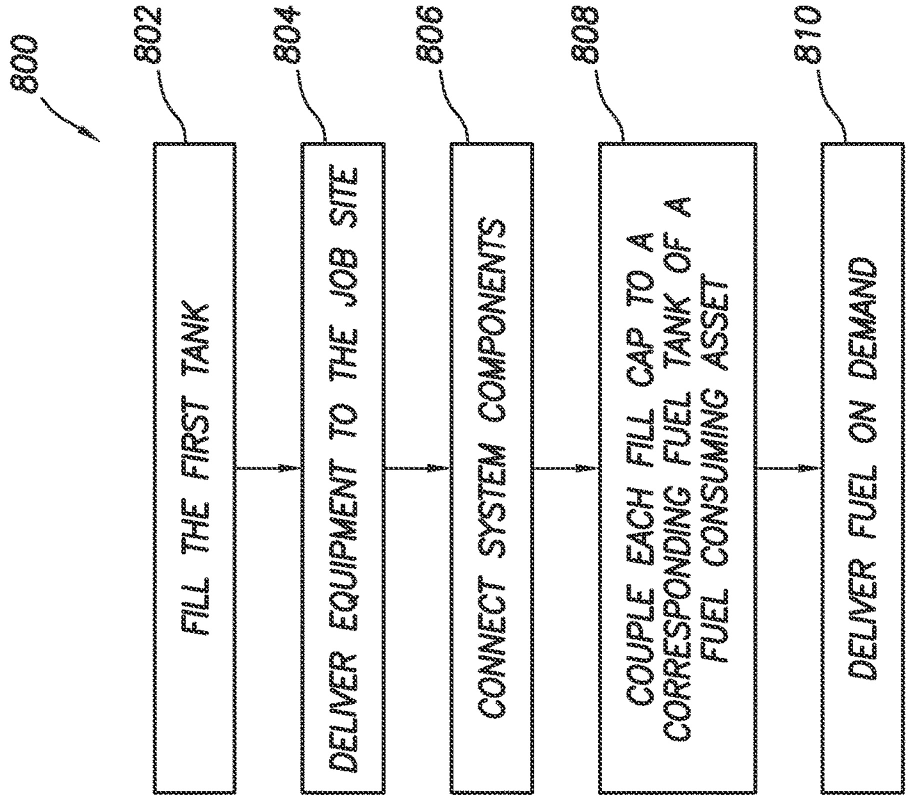
FIG. 8 is a flow chart of the steps for utilizing the disclosed fuel delivery system in accordance with an exemplary embodiment of the present disclosure.

Accordingly, a user can easily refuel one or more fuel consuming assets at a job site using the improved system of the present disclosure. An illustrative improved method for delivering fuel to a fuel consuming asset using the fuel delivery system of the present disclosure is now described in conjunction with FIG. 8. While the illustrative method of refueling contains a number of steps, one or more of these steps may be modified or eliminated without departing from the scope of the present disclosure. Similarly, additional steps may be added to the process without departing from the scope of the present disclosure. The illustrative method of using the improved fuel delivery system of the present disclosure is provided as an example only and is not intended to be a limiting.

First, at step 802, the first tank 202 is filled with the fuel to be delivered (e.g., clear fuel, dyed fuel, etc.). The amount of fuel filled in the first tank 202 depends on the amount of fuel needed for the particular application. Accordingly, the term "filled" as used in this context is not limited to filling the first tank 202 to its maximum capacity and also includes instances when the first tank 202 is filled to an amount less than its maximum capacity. In certain implementations where the manifold permits a compartmentalized delivery of more than one fuel (as described above in conjunction with FIG. 3) other fuels (or more generally, fluids) to be delivered are likewise disposed in a non-pressurized tank (similar to tank 202).

Next, at step 804, the fuel and other system components are delivered to the job site. The first tank 202 carrying the fuel to be delivered is transported to the job site. The second tank 204 is likewise transported to the job site. The compressor 206 and the generator 208 are also transported to the job site. In certain illustrative embodiments, the compressor 206 and the generator 208 may be disposed on a trailer or they may be carried to the job site together with the first tank 202 and/or the second tank 204. In certain illustrative embodiments, more than one compressor and more than one generator may be taken to the job site to provide redundancy in the event of equipment failure. Finally, the manifold 216, the hoses 220, and the fill caps 600 are all delivered to the job site. In embodiments where the manifold permits a compartmentalized delivery of more than one fuel to a fuel consuming asset, a corresponding set of equipment (a corresponding second pressurized tank and optionally, additional compressors and generators) for the delivery of the second fuel to the second compartment of the manifold is likewise delivered to the job site and utilized as discussed below.

In certain implementation where it is desirable to repeatedly refuel the fuel consuming assets 214 at a job site, the non-pressurized tank (i.e., first tank 202) containing the fuel may be refilled and transported back and forth between the job site and the fuel source while the remaining system components (e.g., the second tank 204, the compressor 206, the generator 208, fuel delivery coupling 218, the manifold 216, the hoses 220, and the fill caps 600) may be kept at the job site throughout the performance of the job.

Next at step 806, the system components are connected. Specifically, personnel at the job site will fluidically couple the first tank 202 and the second tank 204 by hooking up the first connection 210, and if present, the optional second connection 212. The second tank 204 is also fluidically coupled to the manifold 216 using the fuel delivery coupling 218. Each fuel consuming asset 214 to be refueled is also fluidically coupled to the manifold 216 using a corresponding hose 220. Specifically, based on the distance between the manifold 216 and each fuel consuming asset 214 the required length of hose 220 is determined. In implementations using a segmented hose, the correct number of hose segments (e.g., 220C1, 220C2, 220C3, 220C4) are coupled together to create the appropriate length of hose 220. A first distal end of the hose 220 is then fluidically coupled to a corresponding spigot 314 of the manifold 216 and a second distal end of the hose 220 is fluidically coupled to a corresponding fill cap 600 as described above.

Next, at step 808, each fill cap 600 is coupled to an opening on a fuel tank 502 of a corresponding fuel consuming asset 214 by tightening the fasteners 618 thereon so that the connecting members 616 keep the connection plate 602 of the fill cap 600 attached to the opening 506 of the fuel tank 502.

Finally, at step 810, fuel is delivered to each fuel consuming asset on demand. Specifically, once the system is connected, fuel is directed from the first tank 202 to the second tank 204 through the first connection 210. The generator 208 then supplies power to the compressor 206 which pressurizes the second tank 204. The pressure applied by the compressor 206 directs fuel from the second tank 204 through the fuel delivery coupling 218 to the manifold 216. Any extra fuel is recirculated back to the first tank 202 through the second connection 212. The manifold 216 then distributes the fuel through each outlet 312 having a spigot 314 with a valve 404, which is turned to the open position. The fuel then flows from the spigots 314 that are turned on (i.e., have a valve 404 in the open position) through the hose 220 to a corresponding fuel consuming asset 214 through the probe 606 of the fill cap 600. Fuel will continue to be delivered to each fuel consuming asset until the "maximum level" of fuel for the particular asset has been reached, at which point the float 610 moves up moving the arm 612 which shuts down the valve 608 on the probe 606 and stops the fuel delivery. The fuel delivery will resume once fuel is consumed and the fuel level goes down taking down the float 610 and moving the valve 608 back to the open position.

Figure 9:
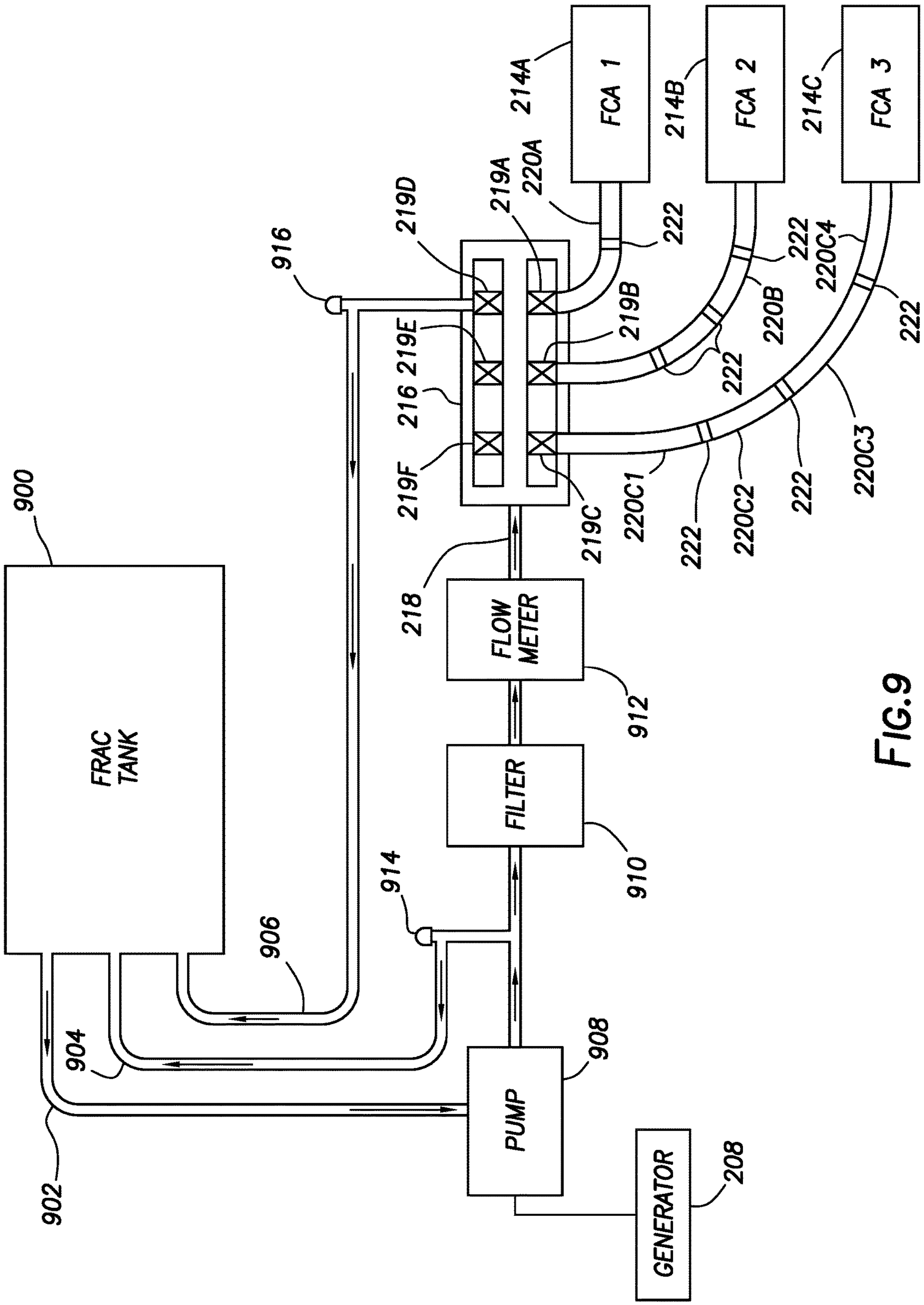
FIG. 9 is a system for delivering fuel to one or more fuel consuming assets in accordance with an exemplary embodiment of the present invention.

FIG. 9 is a system for delivering fuel to one or more fuel consuming assets in accordance with another exemplary embodiment of the present disclosure. The fuel to be delivered is disposed in a tank 900 and delivered to the job site where fuel is needed by the fuel consuming assets 214. In certain embodiments, the tank 900 may be mounted on a trailer. The tank 900 may have any suitable volume for the particular application. For example, in certain illustrative embodiments the tank 900 may have a volume of 500 gallons to 100,000 gallons. In certain illustrative embodiments, the tank 900 may include an outlet 902 and two recirculation inlets 904, 906. A generator 208 may be used to drive a pump 908 that is fluidically coupled to the tank 900 through the outlet 902. Specifically, the pump 908 is operable to pump fuel out of the tank 900 through the outlet 902 through the fuel delivery coupling 218 into the manifold 216. The pump 908 may be any type of pump suitable for the particular application including, but not limited to, piston pump, vein pump, centrifugal pump, pneumatic pump, blade pump in various sizes, etc. The fuel delivery coupling 218 may optionally include a filter 910 to filter the fuel being delivered and a flow meter 912 to measure fluid flow to the manifold 216.

In accordance with an illustrative embodiment of the present disclosure, a first pressure relief valve 914 may be fluidically coupled to the fuel delivery coupling 218 between the pump 908 and the manifold 216. The first pressure relief valve 914 is fluidically coupled to the tank 900 through a first recirculation inlet 904. The first pressure relief valve 914 is set at a predetermined first pressure threshold. Accordingly, if the fuel consuming assets coupled to the manifold 216 are unable to receive the fuel at the rate being delivered by the pump 908, the back-pressure from the manifold 216 in the fuel delivery coupling 218 increases. The pressure continues to build up and once the back-pressure of the fuel in the fuel delivery coupling 218 reaches the first pressure threshold the first pressure relief valve 914 opens. With the first pressure relief valve 914 open, fuel flows from the fuel delivery coupling 218 back to the tank 900 through the first recirculation inlet 904. The first pressure relief valve 914 remains open and fuel continues to flow back to the tank 900 until the pressure in the fuel delivery coupling 218 falls below the predetermined first pressure threshold. At this point, the first pressure relief valve 914 closes, stopping fuel flow back to the tank 900. The predetermined first pressure threshold may be set depending on the particular implementation and system requirements. For example, in certain illustrative embodiments, the first pressure threshold may be set to be between approximately 15 psi to approximately 100 psi.

In accordance with certain illustrative embodiments, a second pressure relief valve 916 is fluidically coupled to the manifold 216 and disposed thereon. The use of two separate pressure relief valves 914, 916 may provide redundancy in the system. The second pressure relief valve 916 is fluidically coupled to the tank 900 through a second recirculation inlet 906. The second pressure relief valve 916 is set at a predetermined second pressure threshold. Accordingly, if the fuel consuming assets coupled to the manifold 216 are unable to receive the fuel at the rate being delivered by the pump 908, the back-pressure from the manifold 216 increases. The pressure continues to build up and once the back-pressure of the fuel in the manifold 216 reaches the predetermined second pressure threshold the second pressure relief valve 916 opens. With the second pressure relief valve 916 open, fuel flows from the manifold 216 back to the tank 900 through the second recirculation inlet 906. The second pressure relief valve 916 remains open and fuel continues to flow back to the tank 900 until the pressure in the manifold 216 falls below the predetermined second pressure threshold. At this point, the second pressure relief valve 916 closes, stopping fuel flow back to the tank 900. The predetermined second pressure threshold may be set depending on the particular implementation and system requirements. In certain illustrative embodiments, the predetermined first pressure threshold of the first pressure relief valve 914 and the predetermined second pressure threshold of the second pressure relief valve 916 may be the same and the two operate in tandem with each providing redundancy. In other illustrative embodiments, the predetermined first pressure threshold of the first pressure relief valve 914 and the predetermined second pressure threshold of the second pressure relief valve 916 may be different. For example, in certain illustrative embodiments, the predetermined second pressure threshold may be set to be between approximately 15 psi to approximately 100 psi.

Although two pressure relief valves are shown in the illustrative embodiment of FIG. 9, as would be appreciated by those of ordinary skill in the art, having the benefit of the present disclosure, in other illustrative embodiments a single pressure relief valve may be used without departing from the scope of the present disclosure. Similarly, more than two pressure relief valves may be used to provide additional redundancy without departing from the scope of the present disclosure. As would be appreciated by those of ordinary skill in the art, having the benefit of the present disclosure, because the fuel is recirculated through the tank 900 which itself contains a fairly large volume of fuel, the fuel does not heat up as a result of the recirculation. Moreover, because fuel is not recirculated directly through the pump 908 (as was the case with prior art pumps having by-pass lines), the pump does not heat up and is not damaged as a result of the recirculation of the fuel.

The first pressure relief valve 914 and the second pressure relief valve 916 may be any suitable pressure relief valve for the particular application. In the exemplary embodiment of FIG. 9, the structure and operation of the manifold 216 and the components downstream therefrom to the fuel consuming assets 214 are the same as that discussed in conjunction with FIGS. 2 through 8. In accordance with certain illustrative embodiments, the generator 208, the pump 908, the filter 910, the flowmeter 912 and the manifold 216 may be mounted on a trailer for easy transport to and from a job site.

Although the present disclosure is generally described in the context of delivering fuel to one or more fuel consuming assets, the methods and systems disclosed herein are not limited to this particular application. Specifically, the same methods and systems may be used in any application where it may be desirable to deliver any fluid to one or more assets that consume that fluid when the fluid consuming assets are located remotely from a fluid source. Accordingly, in such implementations, the “fuel consuming asset” referenced herein can be more generally referred to as a “fluid consuming asset.”

As would be appreciated by those of ordinary skill in the art with the benefit of the present disclosure the methods and systems disclosed herein provide several advantages. For example, once the system has been connected, the operator simply turns on the valve 404 on the spigots 314 corresponding to the fuel consuming assets 214 to be refueled and the system will continue to continuously refuel each asset on-demand without the need for further intervention from the operator. Moreover, the automated nature of the fuel delivery, the use of the segmented hoses 220, and the spigots 314 having individual valves significantly reduces the risk for fuel leakage or spillage. Additionally, the fuel can be delivered to the multiple fuel consuming assets 214 in parallel significantly increasing the efficiency of the fuel delivery process and reducing the risk of one or more fuel consuming assets running out of fuel or being missed in the refueling process. As would be appreciated by those of ordinary skill in the art, having the benefit of the present disclosure, this is not intended to be an exhaustive list of all advantages and benefits of the methods and systems disclosed herein and other advantages are apparent to those of ordinary skill in the art, having the benefit of the present disclosure.

As would be appreciated, numerous other various combinations of the features discussed above can be employed without departing from the scope of the present disclosure. While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope. Accordingly, all changes and modifications that come within the spirit of the disclosure are to be considered within the scope of the disclosure.

The invention claimed is:

1. An apparatus, comprising:

a first tank operable to contain a fluid and having a first recirculation inlet and a second recirculation inlet;

a manifold fluidically coupled to the first tank through a fluid delivery coupling;

a first pressure relief valve fluidically coupled to the fluid delivery coupling, wherein the first pressure relief valve is disposed between the first tank and the fluid delivery coupling, wherein the first pressure relief valve is operable to open when a back-pressure in the fluid delivery coupling exceeds a first predetermined pressure threshold, and wherein the first pressure relief valve is configured to direct fluid in the fluid delivery coupling back to the first tank through the first recirculation inlet when the first pressure relief valve is open;

a second pressure relief valve fluidically coupled to the manifold, wherein the second pressure relief valve is disposed between the manifold and the first tank, wherein the second pressure relief valve is operable to open when a back-pressure in the manifold exceeds a second predetermined pressure threshold, and wherein the second pressure relief valve is configured to direct fluid in the manifold back to the first tank through the second recirculation inlet when the second pressure relief valve is open;

a fluid transporting mechanism having a first distal end fluidically coupled to the manifold and a second distal end fluidically coupled to a hydraulic connector;

wherein the hydraulic connector is fluidically coupled to a probe;

wherein the fluid transporting mechanism is operable to direct the fluid in the manifold to the hydraulic connector;

wherein the hydraulic connector is configured to direct fluid from the fluid transporting mechanism into the probe; and wherein the probe is operable to direct the fluid from the fluid transporting mechanism into a second tank of a fluid consuming asset.

2. The apparatus of claim 1, further comprising the probe and the hydraulic connector, wherein:

the probe is operable to direct the fluid from the fluid transporting mechanism into the second tank through an outlet of the probe.

3. The apparatus of claim 2, further comprising:

a valve coupled to the outlet of the probe;

a float coupled to the valve, wherein the valve is operable to open and close in response to movement of the float; and wherein the valve is configured to be closed when the float moves to a position corresponding to a predetermined maximum level.

4. The apparatus of claim 1, further comprising a spigot at an outlet of the manifold, wherein the spigot fluidically couples the outlet of the manifold to the fluid transporting mechanism.

5. The apparatus of claim 4, wherein the spigot is configured to direct the fluid into the fluid transporting mechanism.

6. The apparatus of claim 4, wherein the spigot further comprises a valve and wherein the valve is operable to regulate fluid flow through the spigot.

7. The apparatus of claim 1, further comprising:

a fill cap, wherein the fill cap is coupled to the probe and the hydraulic connector, and wherein the fill cap comprises a connection plate;

a first connecting member having an inner lip disposed within the second tank and an outer lip disposed outside the second tank, wherein the first connecting member is operable to be inserted through a first opening on the connection plate;

a second connecting member having an inner lip disposed within the second tank and an outer lip disposed outside the second tank, wherein the second connecting member is operable to be inserted through a second opening on the connection plate;

a first fastener operable to cause the inner lip of the first connecting member to contact a wall of the second tank; and a second fastener operable to cause the inner lip of the second connecting member to contact the wall of the second tank.

8. The apparatus of claim 1, wherein the fluid transporting mechanism is selected from a group consisting of: a hose, an aluminum pipe, and a steel pipe.

9. The apparatus of claim 1, wherein the fluid is a fuel and the fluid consuming asset is a fuel consuming asset.

10. The apparatus of claim 1, further comprising a filter configured to filter fluid flowing through the fluid delivery coupling.

11. The apparatus of claim 1, further comprising a flowmeter operable to measure fluid flow to the manifold through the fluid delivery coupling.

12. An apparatus, comprising:

a first tank operable to contain a fluid;

a fluid delivery coupling fluidically coupling the first tank to a manifold;

a first pressure relief valve fluidically coupled to the manifold, wherein the first pressure relief valve is disposed between the manifold and the first tank, wherein the first pressure relief valve is coupled to the first tank through a recirculation inlet, wherein the first pressure relief valve is operable to open when a back-pressure in the manifold exceeds a first predetermined pressure threshold, and wherein the first pressure relief valve is configured to direct fluid in the manifold back to the first tank through the recirculation inlet when the first pressure relief valve is open;

a fluid transporting mechanism having a first distal end fluidically coupled to the manifold;

a fill cap fluidically coupled to a second distal end of the fluid transporting mechanism;

wherein the fill cap is coupled to an opening of a second tank of a fluid consuming asset;

wherein the fluid transporting mechanism is configured to direct fluid from the manifold to the fill cap; and wherein the fill cap is configured to direct fluid from the fluid transporting mechanism into the second tank.

13. The apparatus of claim 12, wherein the fill cap comprises a hydraulic connector fluidically coupled to the second distal end of the fluid transporting mechanism, wherein the hydraulic connector is operable to direct fluid from the fluid transporting mechanism into a probe of the fill cap, wherein the probe is operable to direct fluid from the hydraulic connector through an outlet of the probe into the second tank.

14. The apparatus of claim 13 further comprising:

a valve coupled to the outlet of the probe;

a float coupled to the valve, wherein the valve is operable to open and close in response to movement of the float, and wherein the valve is configured to be closed when the float moves to a position corresponding to a predetermined maximum level.

15. The apparatus of claim 12, wherein the fluid transporting mechanism is selected from a group consisting of: a hose, an aluminum pipe, and a steel pipe.

16. The apparatus of claim 12, wherein the fluid is a fuel and the fluid consuming asset is a fuel consuming asset.

17. The apparatus of claim 12, further comprising a filter configured to filter fluid flowing through the fluid delivery coupling.

18. The apparatus of claim 12, further comprising a flowmeter operable to measure fluid flowing to the manifold through the fluid delivery coupling.

19. The apparatus of claim 12, further comprising a second pressure relief valve fluidically coupled to the fluid delivery coupling, wherein the second pressure relief valve is disposed between the first tank and the fluid delivery coupling, wherein the second pressure relief valve is operable to open when a back-pressure in the fluid delivery coupling exceeds a second predetermined pressure threshold, and wherein the second pressure relief valve is configured to direct fluid in the fluid delivery coupling back to the first tank through a second recirculation inlet when the second pressure relief valve is open.

* * * * *